May 6, 1924.
A. T. BURCH
WAFFLE IRON
Filed June 18, 1923
1,493,444
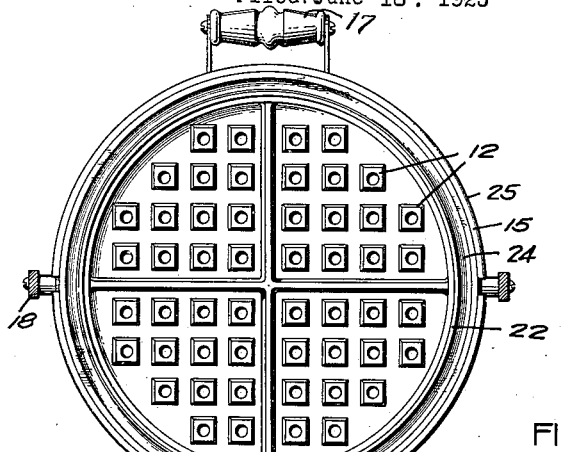
FIG. 1.
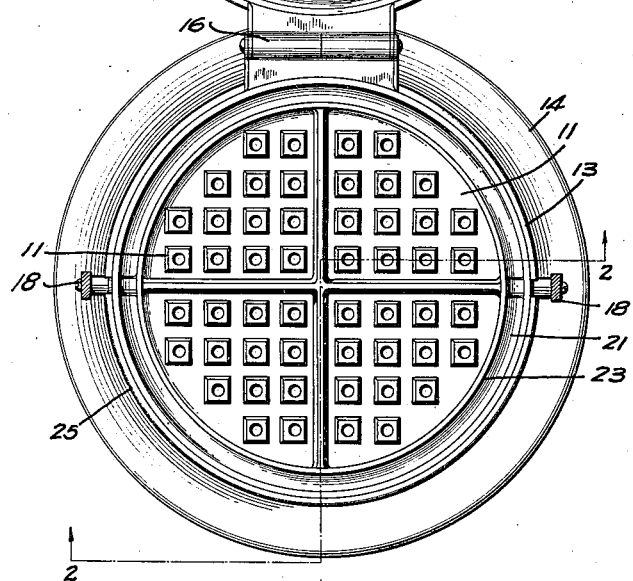
FIG. 2.
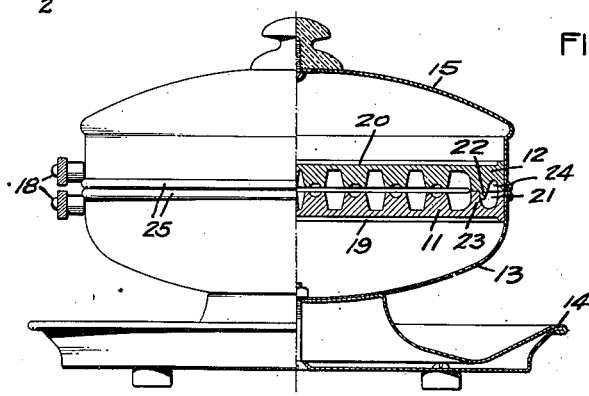
WITNESS:
H. Sherburne
INVENTOR
A. T. Burch
BY White Prost Evans
his ATTORNEYS.

Patented May 6, 1924.

1,493,444

UNITED STATES PATENT OFFICE.

ALFRED T. BURCH, OF BERKELEY, CALIFORNIA.

WAFFLE IRON.

Application filed June 18, 1923. Serial No. 645,950.

*To all whom it may concern:*

Be it known that I, ALFRED T. BURCH, a citizen of the United States, and a resident of the city of Berkeley, in the county of Alameda and State of California, have invented a new and useful Waffle Iron, of which the following is a specification.

This invention relates to a waffle iron, and more particularly to one which comprises a pair of hinged sections to form a waffle mold.

In such waffle irons, the batter, which is previously mixed, is usually poured onto one of the hinged sections, and the other section is then folded over to shape the batter in the mold, after which operation the waffle mold is subjected to a proper cooking temperature. It is usually impossible or impracticable to gauge the exact amount of batter to fill the mold completely, and so, in order to make certain that this is accomplished, a surplus amount is poured onto the iron. This surplusage may and usually does form an unsightly and irregular fringed edge around the waffle. Furthermore, as the batter heats up in the course of the cooking, it tends to expand and overflow from between the sections, which are forced slightly open by the expanding batter. The overflow if permitted runs down the side of the iron and causes a general untidiness. It is also difficult to keep such irons clean, for this reason. It may be attempted to remove the excess batter as it is forced out between the sections by employing a sharp instrument for that purpose. This process is too slow for good results, and this excess can never be completely removed. Another serious disadvantage is that this excess batter prevents the iron from closing completely, and there is thus a loss in heating efficiency.

It is thus one of the objects of my invention to make it possible to remove the excess batter in a very convenient manner.

Another object of my invention is to provide a groove or the like around the iron that will serve to catch the excess batter as it escapes or after it has been cut off.

Another object of my invention is to cause the waffle iron itself to trim off the excesss batter as it closes. This I accomplish by providing appropriate cutting or shearing edges on the waffle sections, which cooperate when they are brought together in closing the iron. When the batter is cooking and the excess is forced out between the sections, these open slightly, but close again after awhile and serve in this case also, to trim off the surplus material.

My invention possesses other advantageous features, some of which, with the foregoing, will be set forth at length in the following description, where I shall outline in full that form of the invention which I have selected for illustration in the drawings accompanying and forming part of the present specification. Although I have shown in the drawings but one embodiment of my invention, I do not desire to be limited thereto, since the invention as expressed in the claims may be embodied in other forms also.

Referring to the drawings:

Figure 1 is a top plan view of a waffle iron embodying my invention, in which the hinged sections are shown in open position; and Fig. 2 is an elevation, partly in section, of the iron shown in Fig. 1, but showing the iron in closed position, and the sectional part being taken along plane 2—2 of Fig. 1.

In the present instance, I have shown my invention applied to an iron of round form, which consists of a lower section 11 and an upper section 12. These sections may have the usual corrugated surfaces which form the waffle mold. The lower section 11 may be appropriately supported in any well-known manner, as by the aid of a hollow shell 13, which in turn is supported on a base 14 of suitable ornamental pattern.

The upper section 12 is supported in another shell 15 which is connected to the lower shell 13 by the aid of a hinge structure 16. A handle 17 fastened at the front of the shell 15 serves as a convenient means for manipulating the iron. The sections 11 and 12 may be heated in any desired manner; thus electrical heating elements may be disposed in the shells 13 and 15 close to the sections 11 and 12. In the present instance also, I show sections 11 and 12 as reversibly supported in the shells 13 and 15, and the reversal therein may be effected by the aid of the thumb pieces 18. In this way it is possible should it be desirable, to expose the flat surfaces 19, 20 for cooking griddle cakes or the like.

The lower section 11 is provided with a peripheral groove 21 into which the excess batter may drop. This batter is sheared off by the closure of the waffle mold sections, and in order to accomplish this result, the upper section 12 has a depending peripheral lip or blade 22 which telescopes over the cooperating knife-like edge 23 of the lower section 11, which edge forms the inner wall of the groove 21. In order to provide additional space for the excess batter, I may also add a groove 24 in the upper section 12.

It is evident from the foregoing description that whatever excess of batter there may be is cut or sheared off, as the iron is closed. The groove 21 serves conveniently as a catch for this excess material, whence it may be cleaned out in any appropriate manner. In case any of the batter should flow out between the sections, the beads 25 formed at the edges of both sections prevent this batter from flowing down over the exterior of shell 13, but instead it drops off onto the base 14. These beads are purposely formed with a small radius of curvature so as to present an abrupt projection over which the batter drops. In this way the pleasing external appearance of the iron is preserved.

I claim:

1. In a waffle iron, a mold section having a groove near its periphery and a shearing edge forming the inner wall of the groove, and a cooperating mold section having a shearing edge telescoping over the first mentioned edge.

2. In a waffle iron, a mold section, a peripheral knife edge extending around the mold section, means forming a groove around this edge, another mold section adapted to cooperate with said first mentioned section to form a waffle mold, and a peripheral knife edge carried by said other section and adapted to telescope over the first mentioned edge.

3. In a waffle iron, a lower mold section, means forming a groove around the edge of the mold section, and another mold section adapted to cooperate with said first mentioned section to form a waffle mold while leaving the groove open around the edge of the lower section.

4. In a waffle iron, a pair of cooperating mold sections, said sections each having a groove around the edge for forming a space within which any excess batter from the mold may be accommodated.

5. In a waffle iron, a pair of cooperating mold sections, a member for supporting one of the sections and forming an external surface for the iron, and means for preventing any excess batter that may escape from between the sections, to flow on said external surface.

6. In a waffle iron, a pair of cooperating mold sections, a member for supporting one of the sections and forming an external surface for the iron, and a bead of relatively abrupt curvature around the edge of the member, so arranged that excess batter escaping between the sections is guided by the bead away from the external surface of the member.

In testimony whereof, I have hereunto set my hand.

ALFRED T. BURCH.